US012703308B2

(12) United States Patent
Frederickson

(10) Patent No.: US 12,703,308 B2
(45) Date of Patent: Aug. 11, 2026

(54) RETENTION APPARATUS FOR VEHICLES AND RELATED METHODS

(71) Applicant: Rivian IP Holdings, LLC, Irvine, CA (US)

(72) Inventor: Austin Lee Frederickson, Carlsbad, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 336 days.

(21) Appl. No.: 18/505,341

(22) Filed: Nov. 9, 2023

(65) Prior Publication Data

US 2025/0108766 A1 Apr. 3, 2025

Related U.S. Application Data

(60) Provisional application No. 63/586,964, filed on Sep. 29, 2023.

(51) Int. Cl.
*B60R 11/00* (2006.01)

(52) U.S. Cl.
CPC ....... *B60R 11/00* (2013.01); *B60R 2011/0059* (2013.01); *B60R 2011/0089* (2013.01)

(58) Field of Classification Search
CPC ........................................................ B60R 11/00
See application file for complete search history.

(56) References Cited

U.S. PATENT DOCUMENTS 5,903,645 A * 5/1999 Tsay .................... B60R 11/0241 248/316.4
7,828,259 B2 * 11/2010 Wang ................. F16M 11/2021 248/316.4
7,925,320 B2 * 4/2011 Pemble ............... H04M 1/6091 455/556.1
8,027,464 B2 * 9/2011 Piekarz ............... B60R 11/0241 379/446
D646,674 S * 10/2011 Liao ............................. D14/253
8,066,241 B2 * 11/2011 Yu .......................... F16M 13/00 248/924
D684,979 S * 6/2013 Chun ........................... D14/447
8,752,802 B1 * 6/2014 Fan ......................... H04M 1/04 248/316.1
8,757,461 B2 * 6/2014 Zanetti .................... B60R 11/02 224/483

(Continued)

*Primary Examiner* — Brian D Nash
(74) *Attorney, Agent, or Firm* — Patterson + Sheridan, LLP

(57) ABSTRACT

The present disclosure relates to retention apparatus, and related components and methods, for vehicles. In one or more embodiments, the retention apparatus is configured to retain an accessory within a cab of a vehicle. In one or more embodiments, a retention apparatus includes an attachment assembly. The attachment assembly includes a pivotable bar pivotable in a first direction to lock the attachment assembly to a component of a vehicle, and an actuation bar movable in an actuation direction to pivot the pivotable bar in a second direction to unlock the attachment assembly. The second direction is different than the first direction. The retention apparatus includes a support arm configured to couple to the attachment assembly and retain an accessory. The support arm includes a semi-ball shaped section configured to interface with a curved plate, and a rod section extending relative to the semi-ball shaped section.

20 Claims, 10 Drawing Sheets

(56) References Cited

U.S. PATENT DOCUMENTS 8,864,089 B2 * 10/2014 Hung .................. F16M 11/041 248/316.1
D717,307 S * 11/2014 Chun .......................... D14/447
D717,360 S * 11/2014 Chun .......................... D16/244
9,115,740 B2 * 8/2015 Chang .................. F16M 11/043
D780,743 S * 3/2017 Chun .......................... D14/447
9,664,214 B1 * 5/2017 Gupta .................. G03B 17/561
9,809,175 B2 * 11/2017 Jonik .................. B60R 11/0241
10,550,991 B2 * 2/2020 Qiu ........................ B64U 20/87
D988,307 S * 6/2023 Luo .............................. D12/415
2006/0011795 A1 * 1/2006 Dobbins ............... F16C 11/106 248/276.1
2006/0215836 A1 * 9/2006 Wang ...................... H04M 1/04 379/455
2014/0130334 A1 * 5/2014 Chun ..................... F16M 13/00 248/122.1
2014/0138419 A1 * 5/2014 Minn ................... F16M 11/105 224/567
2014/0360893 A1 * 12/2014 Whitten ............. A45C 13/1069 206/37
2016/0082893 A1 * 3/2016 Ormsbee ............. B60R 11/0241 224/558
2017/0120840 A1 * 5/2017 Harris ................. B60R 11/0229
2020/0215980 A1 * 7/2020 Kahrens .................. B60R 11/00
2021/0178977 A1 * 6/2021 Gianakopoulos ............................ B64D 11/00152
2023/0294613 A1 * 9/2023 Kuschmeader ........... B60R 9/00 224/555
2024/0336195 A1 * 10/2024 Blanco ...................... B60R 1/04

* cited by examiner 200
201
4A
260
230
4A 201
200
260
8
5
5
230
263
8
262
261
264

RETENTION APPARATUS FOR VEHICLES AND RELATED METHODS

CROSS-REFERENCE TO RELATED APPLICATIONS

This application claims the benefit of U.S. Provisional Patent Application No. 63/586,964, filed Sep. 29, 2023, which is herein incorporated by reference in its entirety.

INTRODUCTION

Moving vehicles generate inertial (e.g., centrifugal) and/or gravitational forces that make it difficult to reliably retain accessories in the vehicles. As an example, forces can move (e.g., dislodge) an accessory in the cab of a vehicle or in other locations of the vehicle (such as in an open-air region of the vehicle), which can damage the accessory and interfere with use of the accessory.

SUMMARY

The present disclosure relates to retention apparatus, and related components and methods, for vehicles. In one or more embodiments, the retention apparatus is configured to retain an accessory within a cab of a vehicle.

In one or more embodiments, a retention apparatus includes an attachment assembly. The attachment assembly includes a pivotable bar pivotable in a first direction to lock the attachment assembly to a component of a vehicle, and an actuation bar movable in an actuation direction to pivot the pivotable bar in a second direction to unlock the attachment assembly. The second direction is different than the first direction.

In one or more embodiments, a retention apparatus includes an attachment assembly and a support arm configured to couple to the attachment assembly. The support arm includes a semi-ball shaped section. The attachment assembly includes a pivotable bar movable in a pivot direction to couple the attachment assembly to a component of a vehicle, and an actuation bar movable in an actuation direction to position the pivotable bar to unlock the attachment assembly.

In one or more embodiments, a method of accessory mounting includes moving an attachment assembly relative to a component. During the movement of the attachment assembly, a pivotable bar moves along the component until a section of the pivotable bar moves past a section of the component and into a locked position.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting in scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
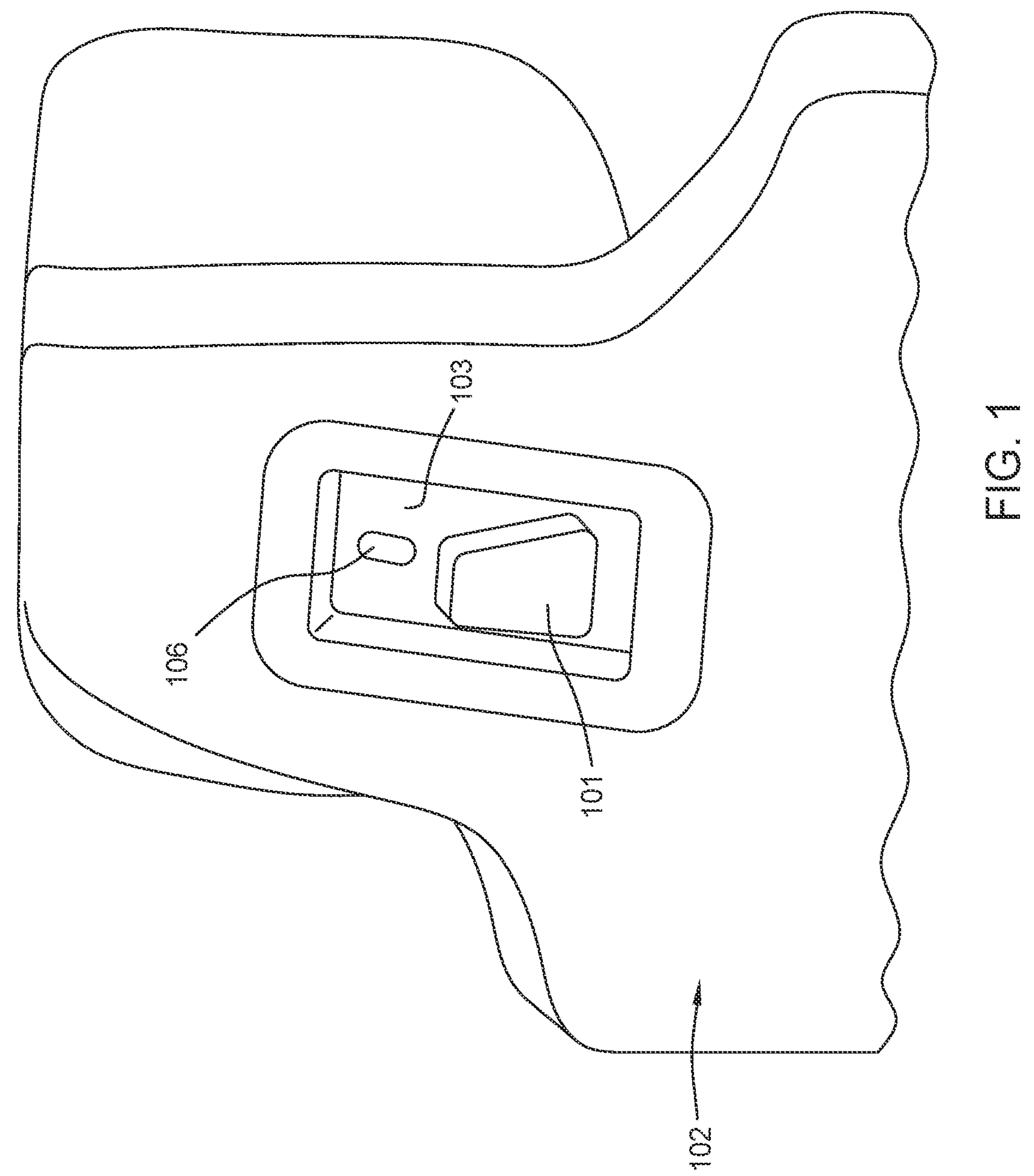
FIG. 1 is a schematic axonometric view of a component disposed in a cab of a vehicle, according to one or more embodiments.

The present disclosure relates to retention apparatus, and related components and methods, for vehicles. In one or more embodiments, the retention apparatus is configured to retain an accessory within a cab of a vehicle. In one or more embodiments, the retention apparatus includes an attachment assembly that is configured to removably couple to a component (such as a seatback arm, e.g., a seatback hook) of the vehicle, and a support arm that is configured to couple to the attachment assembly.

The attachment assembly includes a housing that includes a receptacle opening configured to interface with the component (such as the seatback arm) of the vehicle. After the component of the vehicle is positioned in the receptacle opening, the attachment assembly can be locked to the component. Particularly, the attachment assembly includes a pivotable bar that is pivotable in a first direction to lock the attachment assembly to the component of the vehicle. The attachment assembly also includes an actuation bar movable in an actuation direction to pivot the pivotable bar in a second direction to unlock the attachment assembly. After unlocking, the attachment assembly can be removed from the component of the vehicle.

The support arm is configured to couple to the housing frame of the attachment assembly, and the support arm supports a holder that holds the accessory (such as a personal device (e.g., a tablet or a laptop), a trash bin, a storage device, an organization device, a dog seat, and/or a seat cover). Other accessories are contemplated. The support arm includes a semi-ball shaped section and a rod section extending relative to the semi-ball shaped section. The support arm supports the holder using the semi-ball shaped section, and the holder is pivotable relative to the rod section of the support arm.

The semi-ball shaped section has a center of curvature that is close to a center of gravity of the accessory, such that inertial and/or gravitational forces are less likely to cause the accessory to rotate without user manipulation.

The attachment assembly enables a user to reliably and quickly attach the retention apparatus to the component of the vehicle such that the attachment is maintained under inertial forces and/or gravitational forces. The support arm enables a user to more easily adjust a position (e.g., a tilt angle) of the accessory. The holder is adjustable in size to enable reliable holding of a variety of accessories that have different sizes. The support arm and the holder also hold the accessory in position under inertial forces and/or gravitational forces.

In one or more embodiments, the vehicle is an automotive vehicle, such as an electric vehicle (e.g., an electric truck, a service van). Other vehicles are contemplated, such an internal combustion vehicles, convertibles, electric bicycles (e.g., e-bikes), electric motorcycles, and other vehicles. In one or more embodiments, the component of the vehicle is an arm disposed along a seatback in the cab. The present disclosure contemplates that the attachment assembly can be removably coupled to other component(s) of the vehicle.

The disclosure contemplates that terms used herein such as "couples," "coupling," "couple," and "coupled" may include but are not limited to embedding, bonding, welding, fusing, melting together, interference fitting, and/or fastening such as by using bolts, threaded connections, pins, and/or screws. The disclosure contemplates that terms such as "couples," "coupling." "couple," and "coupled" may include but are not limited to integrally forming. The disclosure contemplates that terms such as "couples," "coupling." "couple," and "coupled" may include but are not limited to direct coupling and/or indirect coupling, such as indirect coupling through components such as links, blocks, and/or frames.

FIG. 1 is a schematic axonometric view of a component 101 disposed in a cab of a vehicle, according to one or more embodiments. In the implementation shown, the component 101 is an arm (such as a hook) disposed along a seatback of a seat 102. The component 101 extends relative to a recess 103 of the seat 102. A port 106 (such as a power port and/or a data port) is formed in the recess 103.

The retention apparatus described herein can be used to removably couple an accessory (such as a tablet) to the component 101 so that a user behind the seat 102 can use the accessory. The present disclosure is not limited to the component 101 in the cab of the vehicle shown in FIG. 1. The retention apparatus described herein can be used in an interior and/or an exterior of any type of vehicle. The present disclosure contemplates that the retention apparatus described herein can removably couple to other vehicle components (such as other vehicle components in the cab) and/or other vehicles that may not have a cab. For example, the various portions of the retention apparatus described herein can be removably coupled to an open-air section of a convertible when a cover of the convertible is lowered, a frame of a bicycle or motorcycle, or a handle bar of a bicycle or motorcycle. The present disclosure contemplates that the component 101 (or another component) can be part of or mounted to the respective open-air section, frame, or handle bar.

Figure 2:
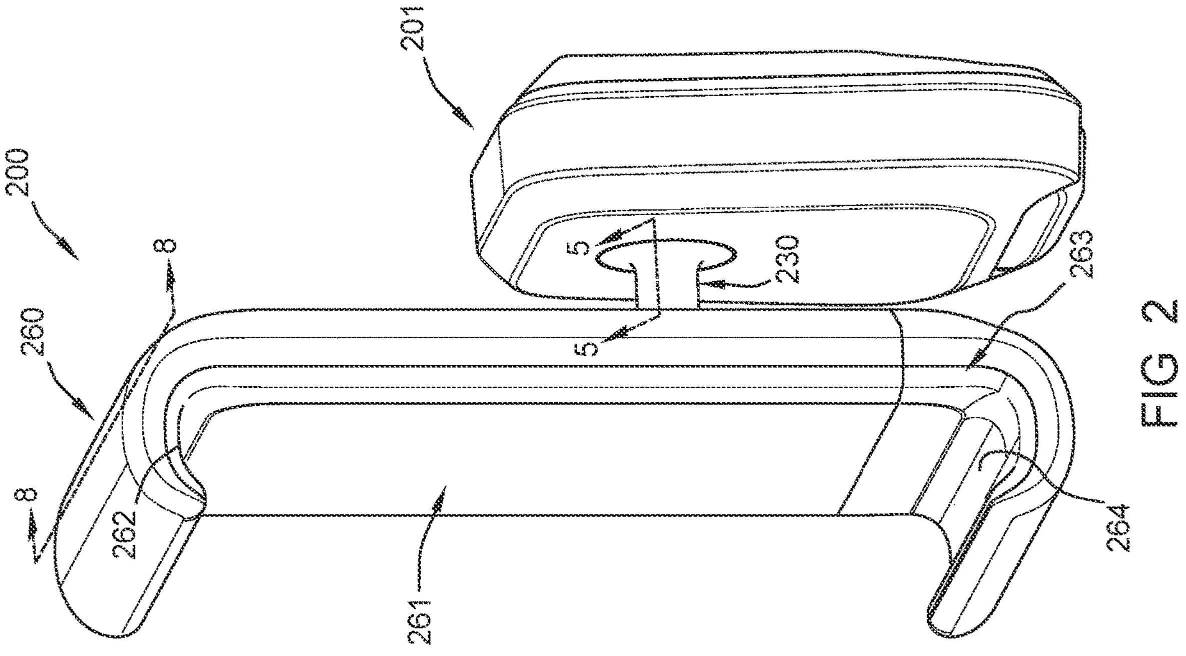
FIG. 2 is a schematic axonometric front view of a retention apparatus, according to one or more embodiments.

FIG. 2 is a schematic axonometric front view of a retention apparatus 200, according to one or more embodiments.

Figure 3:
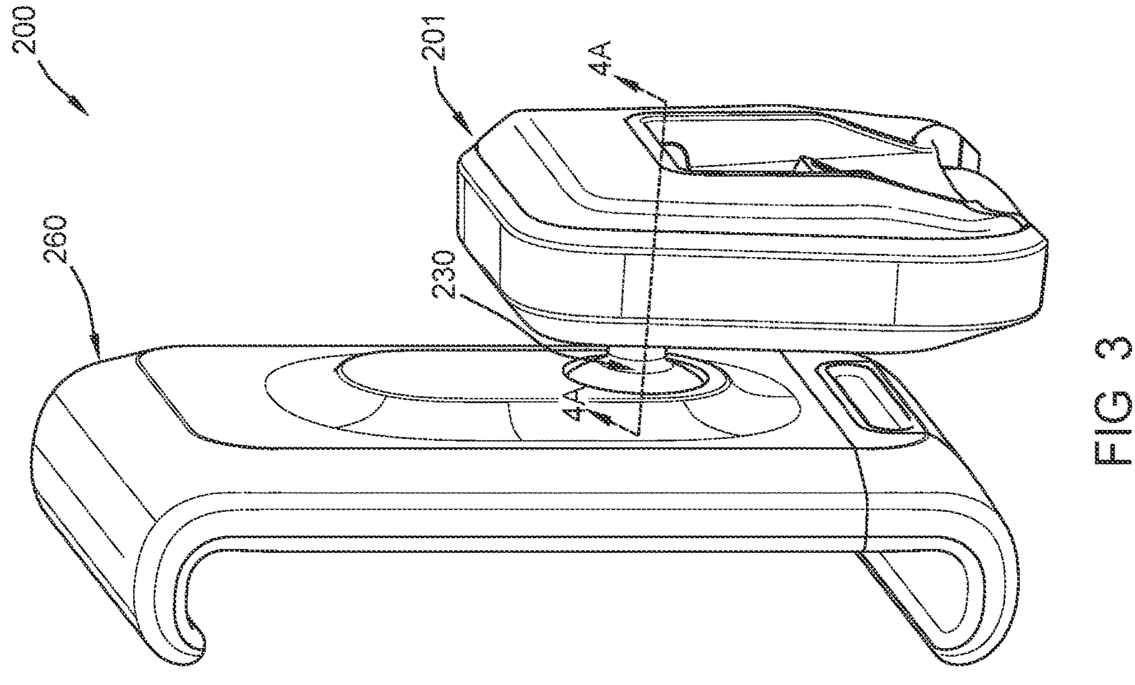
FIG. 3 is a schematic axonometric back view of the retention apparatus shown in FIG. 2, according to one or more embodiments.

FIG. 3 is a schematic axonometric back view of the retention apparatus 200 shown in FIG. 2, according to one or more embodiments.

The retention apparatus 200 includes an attachment assembly 201, a support arm 230 coupled to the attachment assembly 201, and a holder 260 at least partially receiving the support arm 230. The holder 260 is pivotable relative to the support arm 230. The holder 260 includes a first frame 261 that includes a first edge 262 configured to abut against a first side of an accessory. The holder 260 includes a second frame 263 movable relative to the first frame 261, and the second frame 263 includes a second edge 264 configured to abut against a second side of the accessory.

Figure 4A:
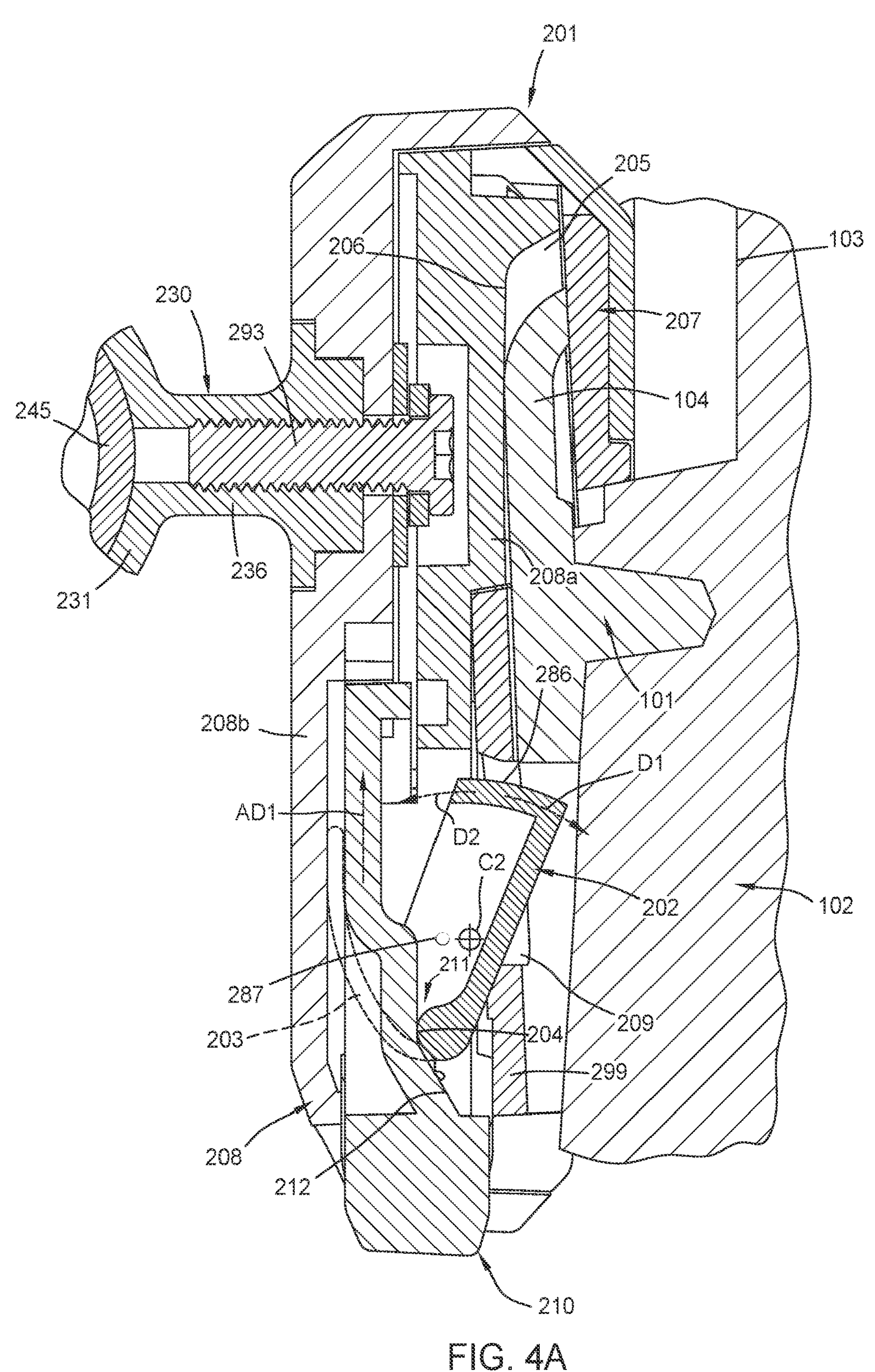
FIG. 4A is a schematic partial side cross-sectional view of the retention apparatus along Section 4-4 shown in FIG. 3, according to one or more embodiments.

FIG. 4A is a schematic partial side cross-sectional view of the retention apparatus 200 along Section 4-4 shown in FIG. 3, according to one or more embodiments.

The attachment assembly 201 includes a pivotable bar 202 that is movable (e.g., pivotable) in a first direction D1 (e.g., a first pivot direction) to lock the attachment assembly 201 to the component 101 of the vehicle, and an actuation bar 210 movable in an actuation direction AD1 to pivot the pivotable bar 202 in a second direction D2 (e.g., a second pivot direction) to unlock the attachment assembly 201. The second direction D2 is different than the first direction D1. In one or more embodiments, the second direction D2 is opposite of the first direction D1.

The support arm 230 is configured to couple to the attachment assembly 201. The support arm 230 includes a semi-ball shaped section 231 configured to interface with a curved plate 245, and a rod section 236 extending relative to the semi-ball shaped section 231. The rod section 236 is coupled to the housing 208 using, for example, one or more fasteners 293 (one is shown). The semi-ball shaped section 231 is received at least partially in the first frame 261 of the holder 260. The attachment assembly 201 includes one or more first biasing elements 203 configured to bias the pivotable bar 202 in the first direction D1 and toward a lock opening 209 formed in a housing 208 of the attachment assembly 201. In one or more embodiments, the housing 208 includes a first segment 208*a* coupled to a second segment 208*b*. The pivotable bar 202 and the actuator bar 210 are positioned at least partially in an actuation channel 219. In one or more embodiments, the housing 208 includes an outer width within a range of 0.5 inches to 5 inches, and an outer height within a range of 1 inch to 7 inches.

The pivotable bar 202 is coupled to the housing 208 using one or more pins 287 (shown in ghost in FIG. 4A). The present disclosure contemplates that the pivotable bar 202 and/or the one or more first biasing elements 203 can be integrally formed with the housing 208.

The pivotable bar 202 is configured to pivot at least partially out of and into the actuation channel 219 when locking and unlocking the attachment assembly 201 to and from the component 101. The actuation bar 210 includes a recess 211, and a curved outer surface 204 of the pivotable bar 202 is positioned in the recess 211 to abut against a recessed outer surface 212 of the actuation bar 210. When the actuation bar 210 moves in the actuation direction AD1, the recessed outer surface 212 pushes against the curved outer surface 204 to pivot the pivotable bar 202 in the second direction D2.

The attachment assembly 201 includes a first arm 207 (such as a first hook) extending relative to an outer surface 206 of the housing 208 define a receptacle opening 205 between the housing 208 and the first arm 207. The first arm 207 is configured to couple to a second arm 104 (such as a second arm) of the component 101. When the second arm 104 is coupled to the first arm 207, the second arm 104 is positioned (i) in the receptacle opening 205 and (ii) between the lock opening 209 and the first arm 207. The lock opening 209 is formed in a first wall 299 of the housing 208. The lock opening 209 is positioned offset from the receptacle opening 205 and at a distance from an end of the first arm 207.

An abutment edge 286 of the pivotable bar 202 has a center of curvature C2 that is offset from the one or more pins 287 about which the pivotable bar 202 pivots. In one or more embodiments, the center of curvature C2 is aligned between the one or more pins 287 and the lock opening 209. The position of the center of curvature C2 causes the pivotable bar 202 to tend to pivot in the first direction D1 and into a locked position (e.g., toward the lock opening 209) when the pivotable bar 202 abuts against the component 101. The position of the center of curvature C2 causes the pivotable bar 202 to tend to pivot in the first direction D1 rather than the second direction D2. The abutment edge 286 abuts against the second arm 104 if the attachment assembly 201 moves upwardly without the actuation bar 210 being pressed in the actuation direction AD1, which biases the pivotable bar 202 in the first direction D1 and maintains the attachment assembly 201 as locked to the second arm 104.

The one or more first biasing elements 203 include one or more legs of the pivotable bar 202 that abut against a second wall 298 of the housing 208, and the one or more legs of the pivotable bar 202 extend through the actuation bar 210. Other biasing elements are contemplated. For example, the one or more first biasing elements 203 can be coil springs, tape springs, wave springs, torsion springs, and/or flat springs. Other springs are contemplated. The actuation channel 219 is defined between (i) the first wall 299 of the housing 208 and (ii) the second wall 298 of the housing 208. The second wall 298 is opposite of the first wall 299 across the actuation channel 219.

During installation of the attachment assembly 201 onto the second arm 104, the attachment assembly 201 slides downward, and the pivotable bar 202 moves (e.g., slides) along the second arm 104 until a section (e.g., the abutment edge 286) of the pivotable bar 202 moves downwardly past a section (e.g., the second arm 104) of the component 101, which allows the pivotable bar 202 to move in the first direction D1 and into the locked position (e.g. into the lock opening 209).

Figures 4B, 5:
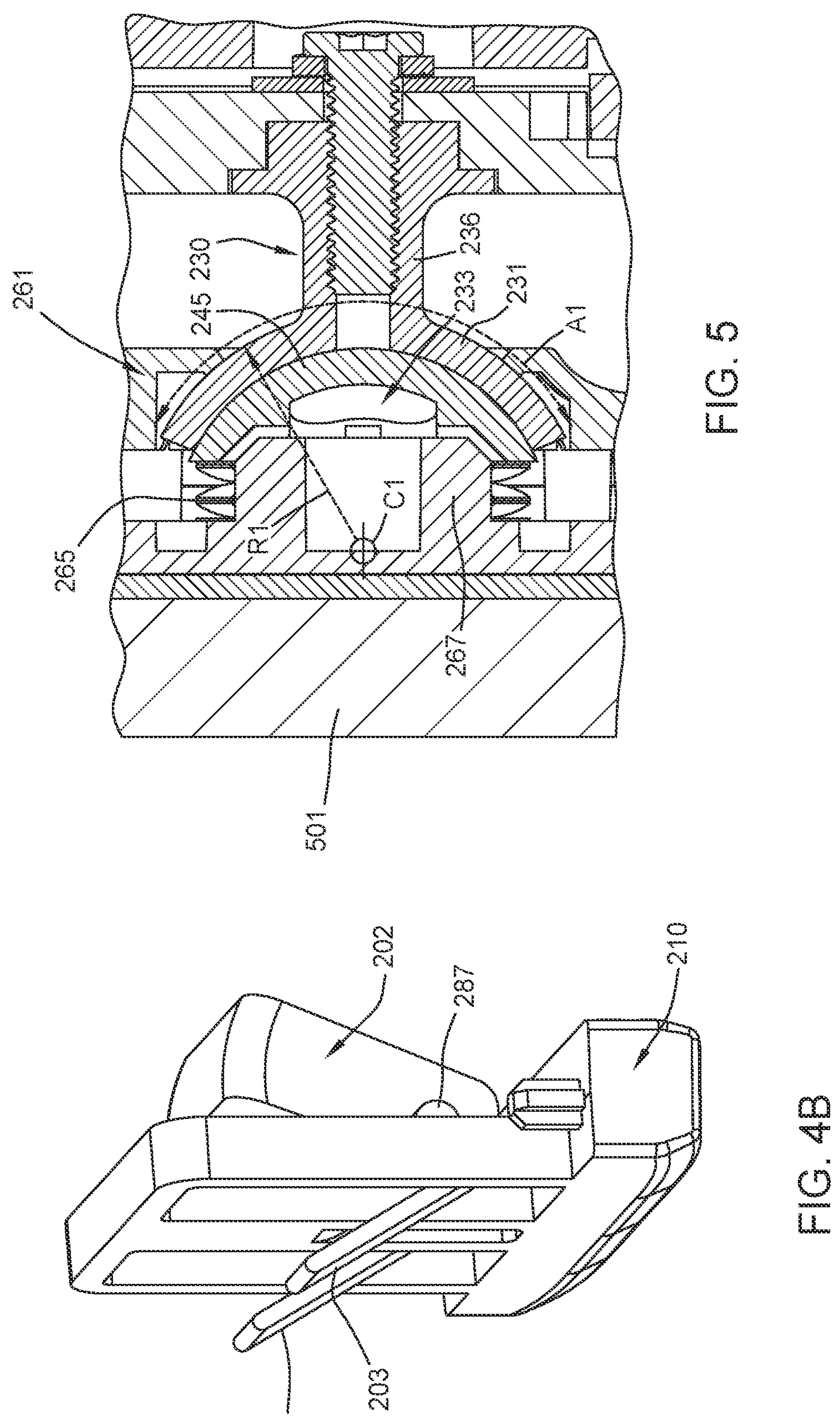
FIG. 4B is a schematic axonometric view of the pivotable bar and the actuation bar, according to one or more embodiments.
FIG. 5 is a schematic partial side cross-sectional view of the retention apparatus along Section 5-5 shown in FIG. 2, according to one or more embodiments.

FIG. 4B is a schematic axonometric view of the pivotable bar 202 and the actuation bar 210, according to one or more embodiments.

FIG. 5 is a schematic partial side cross-sectional view of the retention apparatus 200 along Section 5-5 shown in FIG. 2, according to one or more embodiments.

The curved plate 245 and the first frame 261 are pivotable relative to the semi-ball shaped section 231 to adjust a position of an accessory 501 (held by the holder 260) relative to the component 101 of the vehicle. The curved plate 245 is received at least partially in the holder 260. The semi-ball shaped section 231 has a center of curvature C1 that is positioned outside of an inner space 233 defined by the semi-ball shaped section 231. The center of curvature C1 is aligned between a center of gravity of the accessory 501 and the curved plate 245. In one or more embodiments, the semi-ball shaped section 231 has a radius of curvature R1 that is at least 0.5 inches, such as 0.75 inches or higher, for example 1.0 inches or higher. In one or more embodiments, the semi-ball shaped section 231 has an azimuthal angle A1 that is less than 180 degrees.

The holder 260 includes one or more biasing elements 265 positioned in the first frame 261 and configured to bias the curved plate 245 toward the semi-ball shaped section 231 to generate a friction force that opposes movement of the first frame 261. The present disclosure contemplates that a surface treatment, such as a surface roughening and/or a friction coating, can generate the friction force between the semi-ball shaped section 231 and the curved plate 245 and/or between the semi-ball shaped section 231 and the first frame 261. After a user overcomes the friction force and tilts the first frame 261 to adjust the position of the accessory, the friction force opposes movement of the first frame 261 that is not user-initiated. In one or more embodiments, the curve plate 245 tilts with the first frame 261 and relative to the semi-ball shaped section 231. In one or more embodiments, one or more biasing elements 265 apply a force of about 35 pounds on the curved plate 245. The position of the center of curvature C1 resists movement of the first frame 261 that is not user-initiated. In one or more embodiments, the one or more biasing elements 265 include a wave spring. In one or more embodiments, the one or more biasing elements 265 have a spring force that is selected such that the spring force multiplied by the R1 and a friction coefficient (e.g., between the curved plate 245 and semi-ball shaped section 231) is greater than a weight of the accessory 501 being retained multiplied by a distance between the center of curvature C1 and the center of gravity of the accessory 501. The distance can be perpendicular to gravity. Other spring forces are contemplated. For example, the spring force can vary due to exemplary factors such as dimensions and/or weights of the accessory 501, the support arm 230, and/or the holder 260. Other biasing elements are contemplated. For example, the one or more biasing elements 265 can be coil springs, tape springs, wave springs, torsion springs, and/or flat springs. Other springs are contemplated. The one or more biasing elements 265 are disposed about a boss 267 of the first frame 261.

Figure 6:
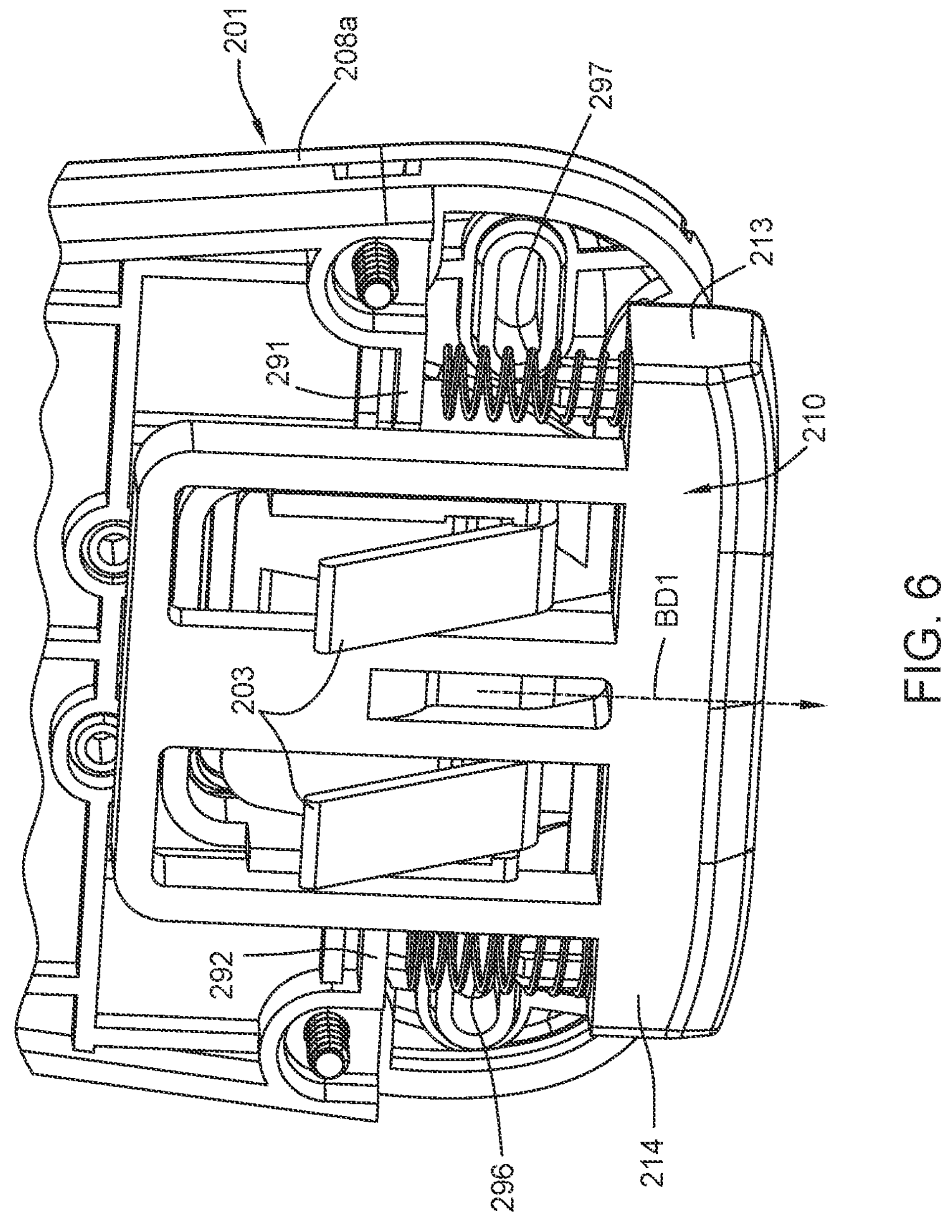
FIG. 6 is a schematic partial axonometric view of the attachment assembly with the second segment of the housing hidden, according to one or more embodiments.

FIG. 6 is a schematic partial axonometric view of the attachment assembly 201 with the second segment 208*b* of the housing 208 hidden, according to one or more embodiments.

The attachment assembly 201 includes one or more second biasing elements 296, 297 (two are shown) configured to bias the actuation bar 210 in a bias direction BD1 that is opposite of the actuation direction AD1. In one or more embodiments, the second biasing elements 296, 297 include coil springs. Other biasing elements are contemplated. For example, the one or more second biasing elements 296, 297 can be tape springs, wave springs, torsion springs, and/or flat springs. Other springs are contemplated. In one or more embodiments, the one or more second biasing elements 296, 297 are positioned between one or more shoulders 213, 214 of the actuator bar 210 and one or more shoulders 291, 292 of the housing 208.

Figure 7:
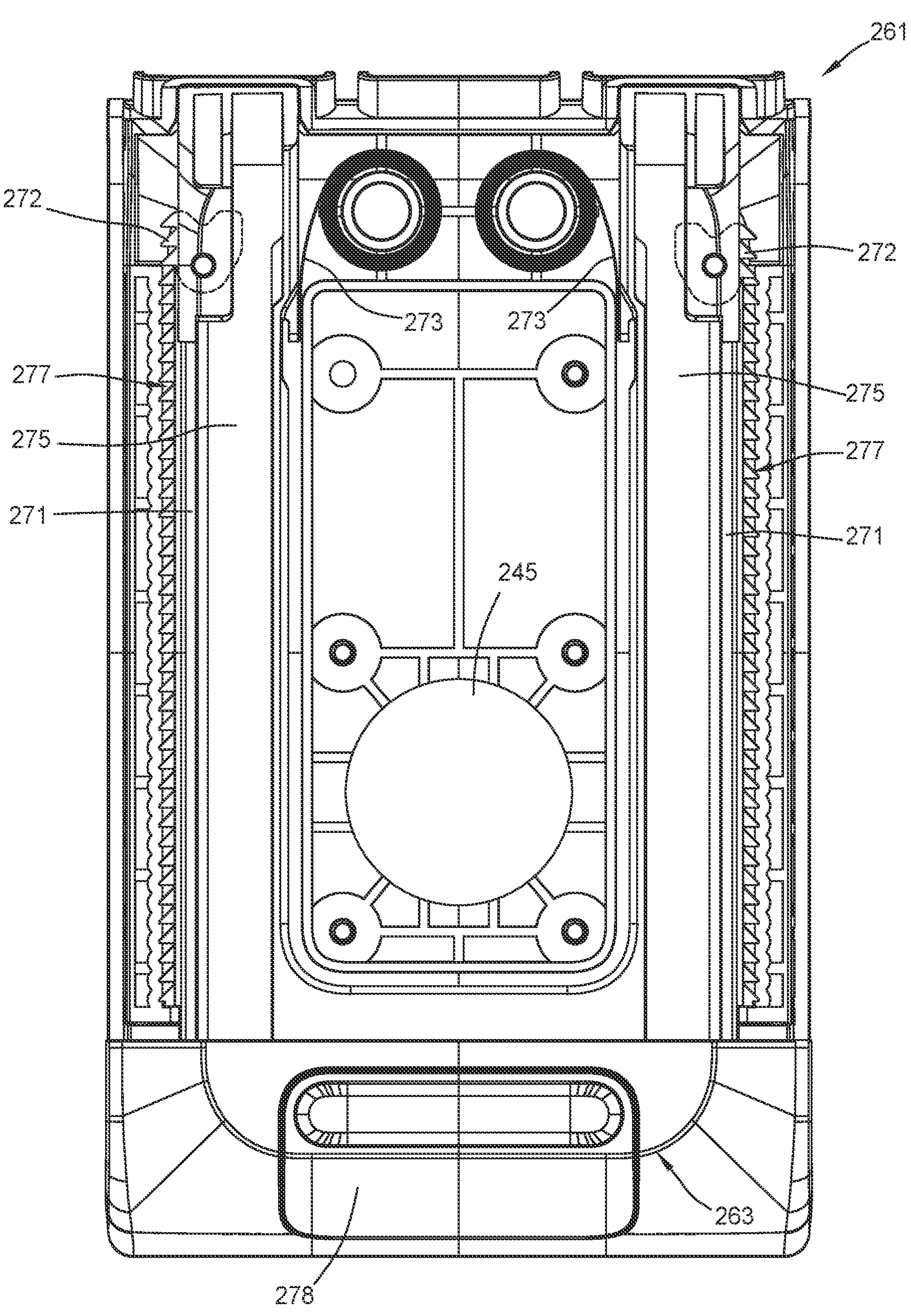
FIG. 7 is a schematic axonometric back view of the holder with part of the first frame hidden, according to one or more embodiments.

FIG. 7 is a schematic axonometric back view of the holder 260 with part of the first frame 261 hidden, according to one or more embodiments. The second frame 263 includes one or more columns 271 (two are shown) extending into the first frame 261, and one or more pawls 272 (two are shown) positioned in the one or more columns 271 and pivotably coupled to the one or more columns 271.

The holder 260 also includes one or more biasing elements 273 (two are shown) coupled between the first frame 261 and the one or more columns 271 of the second frame 263. Each of the one or more biasing elements 273 is wound about a boss of the first frame 261 and is coupled to one of the columns 271. In one or more embodiments, the one or more biasing elements 273 include tape springs. Other biasing elements are contemplated. For example, the one or more biasing elements 273 can be coil springs, wave springs, torsion springs, and/or flat springs. Other springs are contemplated. In one or more embodiments, the one or more biasing elements 273 are constant force springs that apply a force of 10 pounds or less, such as about 5 pounds or less, for example, about 3 pounds.

The force applied by the one or more biasing elements 273 is relatively small compared to other accessory holders. As the one or more pawls 272 engage the interference interface 277 an additional force (in addition to the force applied by the one or more biasing elements 273) is applied to the accessory through the second frame 263. As the one or more pawls 272 engage the interference interface 277 the second frame 263 moves (e.g., by 1 mm to 4 mm) relative to the first frame 261, which facilitates reliably locking the second frame 263 in place by having a tight abutment of the first and second frames 261, 263 against the accessory.

The smaller force of the one or more biasing elements 273 and the tight abutment against the accessory makes it easier for a user to manipulate the holder 260 to place the accessory (e.g., tablet) in the holder 260, and lock the second frame 263 to retain the accessory. As an example, it is easier (e.g., as compared to other accessory holders) for a user to manipulate the holder 260 in a one-handed manner while ensuring that the resulting holding of the accessory is secure and reliable. The holder 260 includes one or more actuator columns 275 (two are shown) coupled to a handle 276. The actuator columns 275 extend into the first frame 261. The pawls 272 are configured to engage and disengage an interference interface 277 of the first frame 261. In one or more embodiments, each pawl 272 includes teeth configured to interleave between teeth of the interference interface 277 when engaged. Other interference interfaces are contemplated.

The holder 260 includes a handle 278 coupled to the one or more actuator columns 275. The handle 278 is movable relative to the second frame 263 (and relative to the first frame 261) to engage and disengage the pawls 272 to and from the interference interface 277. For example, a user can pull the handle 278 downwardly to move the actuator columns 275 downwardly and against the pawls 272, which pivots the pawls 272 away from the interference interface 277 to disengage the pawls 272. When the pawls 272 are disengaged, the user can pull the second frame 263 downwardly to enlarge a distance between the first edge 262 and the second edge 264. Once positioned at a target distance, the handle 278 can move back toward the second frame 263, causing second ledges 280 of the actuator columns 275 to push the pawls 272 back toward the interference interface 277 to lock the holder 260 at the target distance. The user can move the handle 278 toward the second frame 263, and/or one or more biasing elements can move the handle 278 toward the second frame 263. For example, one or more springs can abut against the handle 278 and/or the actuator columns 275, or one or more springs can be integrally formed with the actuator columns 275. The one or more biasing elements 273 can move the second frame 263 toward the first frame 261.

The support arm 230 and/or the curved plate 245 can be formed of a metal (such as aluminum or stainless steel) or a polymer (such as acetol polymer (POM)). In one or more embodiments, the support arm 230 is formed of a metal such as aluminum or stainless steel, and the curved plate 245 is formed of a polymer such as acetol polymer (POM). In one or more embodiments, the attachment assembly 201 (including e.g., the pivotable bar 202, the actuation bar 210 and the housing 208) and/or the holder 260 (including, e.g., the first frame 261, the second frame 263, and the handle 278) are formed of a polymer and/or a metal, such as stainless steel and/or aluminum. The holder 260 can include non-metallic (such as elastomeric) liners configured to interface with the accessory 501.

Figure 8:
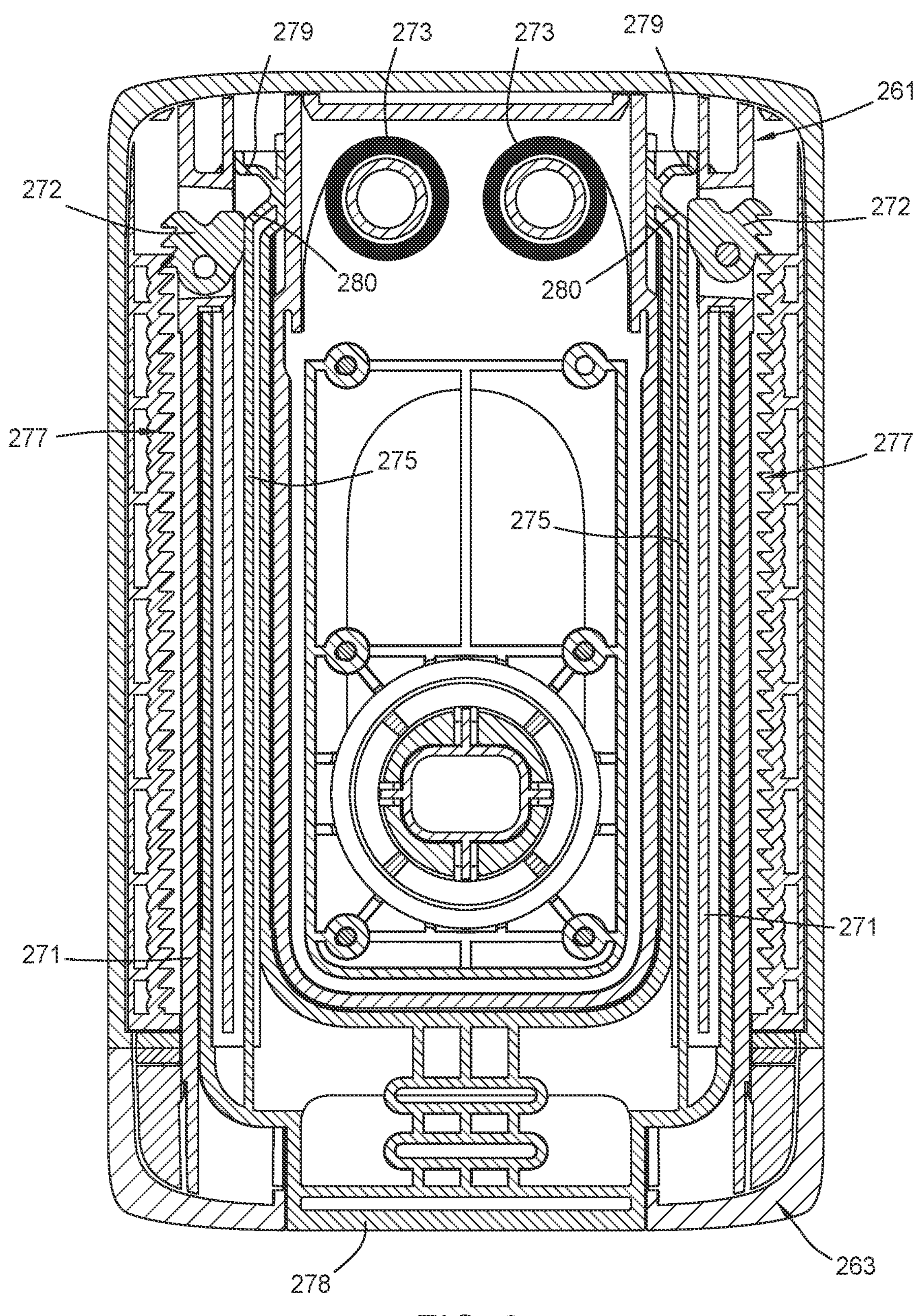
FIG. 8 is a schematic partial side cross-sectional view of the holder along Section 8-8 shown in FIG. 2, according to one or more embodiments.

FIG. 8 is a schematic partial side cross-sectional view of the holder 260 along Section 8-8 shown in FIG. 2, according to one or more embodiments.

Figure 9:
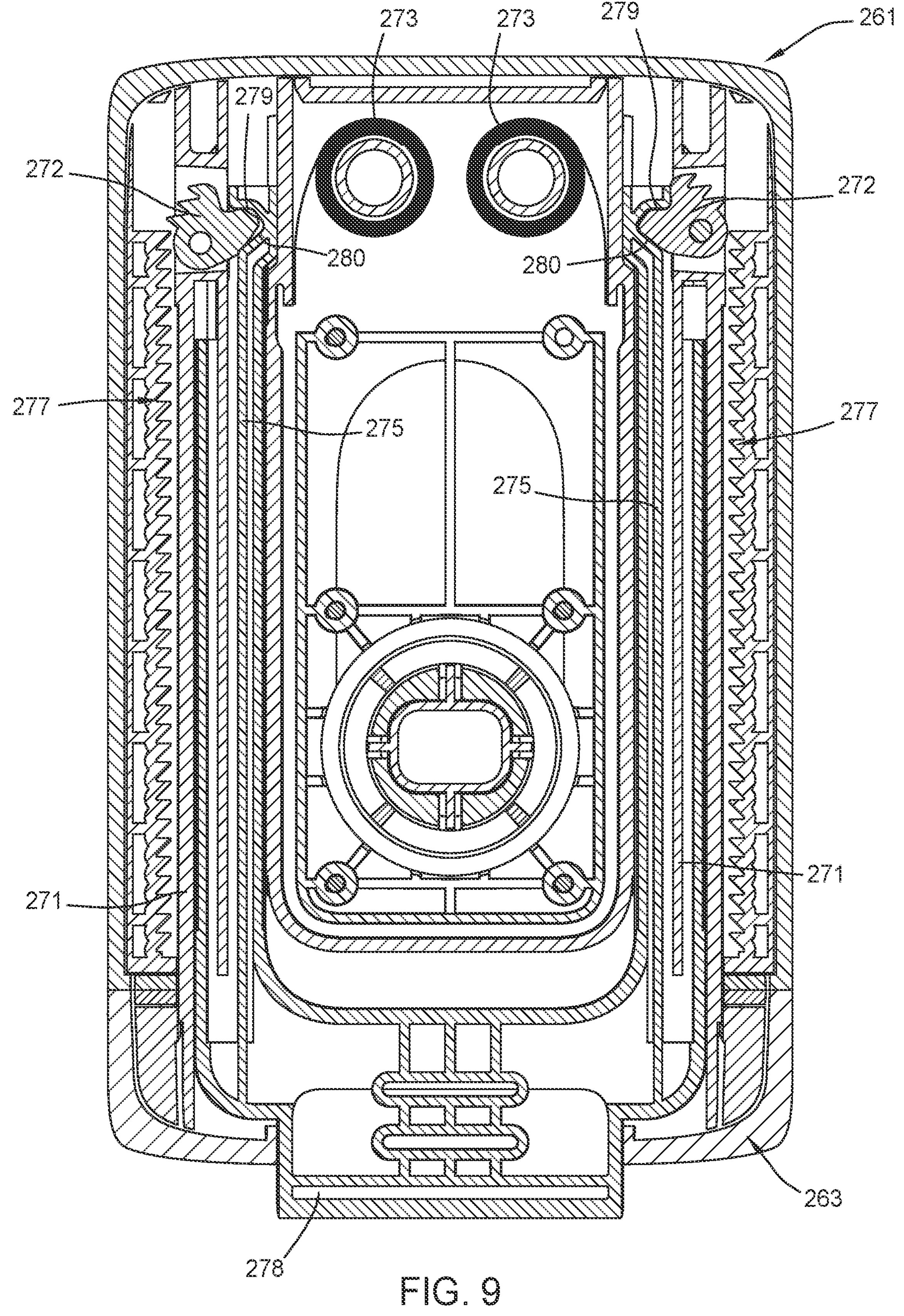
FIG. 9 is a schematic partial side cross-sectional view of the holder shown in FIG. 8, with the handle and the actuator columns pulled downward, according to one or more embodiments.

FIG. 9 is a schematic partial side cross-sectional view of the holder 260 shown in FIG. 8, with the handle 278 and the actuator columns 275 pulled downward, according to one or more embodiments. When pulled downward, ledges 279 of the actuator columns 275 engage the pawls 272 to pivot the pawls 272.

Figure 10:
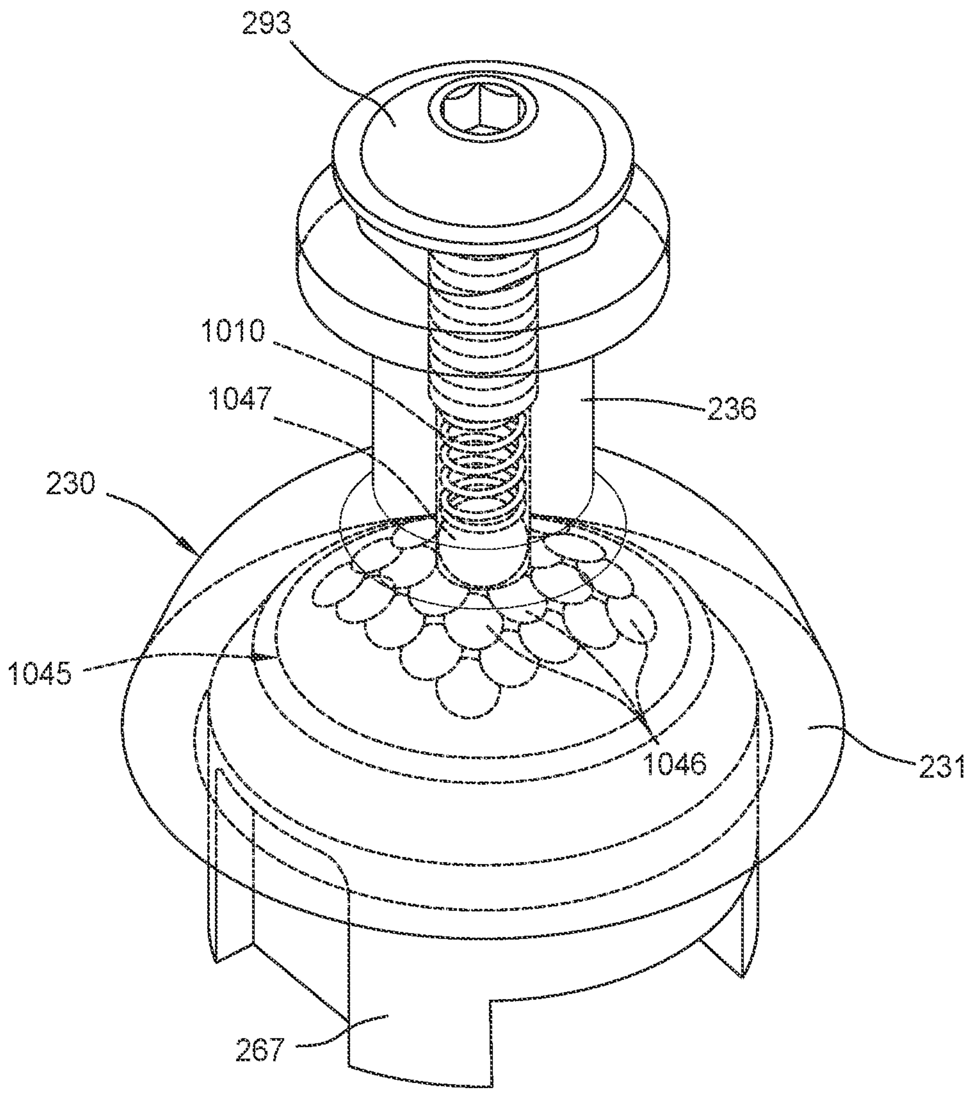
FIG. 10 is a schematic perspective view of the support arm and a curved plate, according to one or more embodiments.

FIG. 10 is a schematic perspective view of the support arm 230 and a curved plate 1045, according to one or more embodiments.

The curved plate 1045 can be used in place of the curved plate 245 shown in FIG. 2. A biasing element 1010 is disposed in the rod section 236. The curved plate 1045 includes a plurality of detent openings 1046 formed in an outer surface of the curved plate 1045. Each detent opening 1046 corresponds to a different orientation of the holder 260 relative to the support arm 230. A detent 1047 (such as a ball) is configured to be positioned in at least one of the detent openings 1046. The detent openings 1046 can be arcuate in shape (such as semi-spherical in shape) as shown in FIG. 10, or the detent openings 1046 can be another shape such as rectangular (e.g., square). Additionally, the detent openings 1046 can be arcuate grooves that extend azimuthally along the outer surface of the curved plate 1045. The present disclosure contemplates that the detent openings 1046 can be formed in the semi-ball shaped section 231 and/or the detent 1047 can be integrally formed with the curved plate 245. The shapes of the detent openings 1046 and the detent 1047 enables a user to overcome the force of the biasing element 1010 such that the detent 1047 can move out of one of the detent openings 1046 to adjust a tilt of the holder 260 and the held accessory relative to the support arm 230. As the user tilts the holder 260, the detent 1047 can move into other detent openings 1046 until a desired tilt position is established, and the detent 1047 moves into a corresponding detent opening 1046 to lock the tilt of the holder 260. After the tilt is locked, the biasing element 1010 biases the detent 1047 into the corresponding detent opening 1046 and against the curved plate 1045 such that certain inertial and/or gravitation forces are not sufficient to cause the detent 1047 to move out of the corresponding detent opening 1046, which retains the holder 260 in the desired tilt position under the inertial and/or gravitation forces. In one or more embodiments, the biasing element 1010 generates a biasing force (e.g., a spring force) within a range of 5 pounds to 10 pounds. Other biasing forces are contemplated. For example, the biasing force can vary due to exemplary factors such as dimensions and/or weights of the detent opening(s) 1046, the detent 1047, the accessory, the support arm 230, and/or the holder 260.

The present disclosure contemplates that a more complete ball shape (e.g., a section having a higher azimuthal angle A1) can be used in place of the semi-ball shaped section 231.

The present disclosure contemplates that one or two of the attachment assembly 201, the support arm 230, and/or the holder 260 can be omitted. As an example, the support arm 230 and the holder 260 can be omitted, and the attachment assembly 201 (such as the housing 208) can be coupled to or at least partially integrally formed with the accessory (such as an accessory housing). The present disclosure also contemplates that the holder 260 can be omitted, and the support arm 230 (such as the semi-ball shaped section 231) can be received in, coupled to, or at least partially integrally formed with the accessory (such as an accessory housing).

Figure 11:
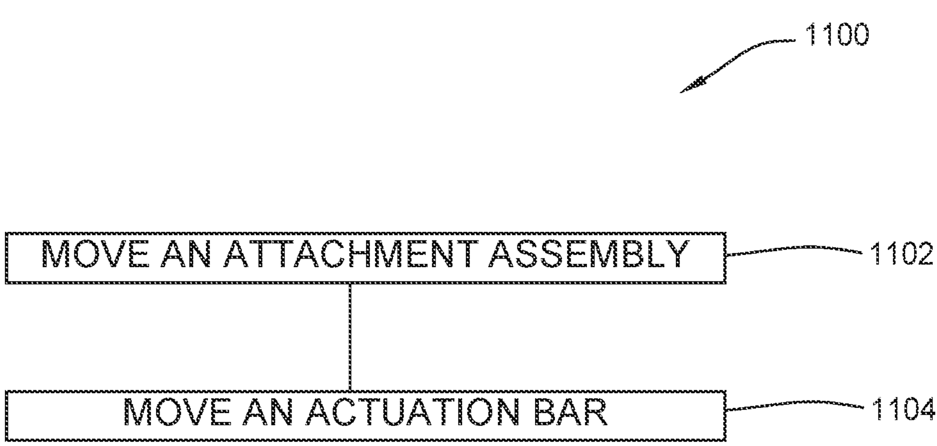
FIG. 11 is a schematic flow chart view of a method of accessory mounting, according to one or more embodiments.

FIG. 11 is a schematic flow chart view of a method 1100 of mounting an accessory, according to one or more embodiments.

Operation 1102 includes moving an attachment assembly (such as the attachment assembly 201) relative to a component (such as the component 101). During the movement of the attachment assembly, a pivotable bar (such as the pivotable bar 202) moves along the component until a section of the pivotable bar moves past a section of the component and into a locked position.

Operation 1104 includes moving an actuation bar (such as the actuation bar 210) to abut against the pivotable bar and move the pivotable bar into an unlocked position.

Benefits of the present disclosure include reduced or eliminated likelihood of a retained accessory moving (e.g., pivoting) under inertial forces and/or gravitational forces without user manipulation; reliably and quickly attaching a retention apparatus to a component of a vehicle; ease of adjustment of a position (e.g., a tilt angle) of the accessory; and size adjustability to enable reliable holding of a variety of accessories that have varying sizes.

It is contemplated that one or more aspects disclosed herein may be combined. As an example, one or more aspects, features, components, operations and/or properties of the embodiments of the component 101, the retention apparatus 200, the attachment assembly 201 (including, e.g., the pivotable bar 202 and/or the actuation bar 210), the support arm 230, the holder 260, the curved plate 245, the biasing element 1010, the curve plate 1045, the detent openings 1046, the detent 1047, and/or the method 1100 may be combined. Moreover, it is contemplated that one or more aspects disclosed herein may include some or all of the aforementioned benefits.

While the foregoing is directed to embodiments of the present disclosure, other and further embodiments of the disclosure may be devised without departing from the basic scope thereof, and the scope thereof is determined by the claims that follow.

What is claimed is:

1. A retention apparatus, comprising:
an attachment assembly comprising:
a pivotable bar pivotable in a first direction to lock the attachment assembly to a component of a vehicle,
an actuation bar movable in an actuation direction to pivot the pivotable bar in a second direction to unlock the attachment assembly, the second direction different than the first direction;
one or more first biasing elements configured to bias the pivotable bar in the first direction and toward a lock opening formed in a housing of the attachment assembly; and
one or more second biasing elements configured to bias the actuation bar in a bias direction that is opposite of the actuation direction.

2. The retention apparatus of claim 1, further comprising a support arm configured to couple to the attachment assembly, wherein the support arm comprises:
a semi-ball shaped section configured to interface with a curved plate, wherein the curved plate is pivotable relative to the semi-ball shaped section to adjust a position of an accessory relative to the component of the vehicle, and
a rod section extending relative to the semi-ball shaped section.

3. The retention apparatus of claim 2, wherein the semi-ball shaped section has a center of curvature that is positioned outside of an inner space defined by the semi-ball shaped section.

4. The retention apparatus of claim 2, wherein the semi-ball shaped section has a radius of curvature that is at least 0.5 inches.

5. The retention apparatus of claim 4, wherein the semi-ball shaped section has an azimuthal angle that is less than 180 degrees.

6. The retention apparatus of claim 1, wherein the attachment assembly further comprises a first arm extending relative to an outer surface of the housing of the attachment assembly to define a receptacle opening between the housing and the first arm.

7. The retention apparatus of claim 6, wherein:
the first arm is configured to couple to a second arm of the component of the vehicle, and
when the second arm is coupled to the first arm, the second arm is positioned (i) in the receptacle opening and (ii) between the lock opening and the first arm.

8. The retention apparatus of claim 6, wherein the lock opening is positioned offset from the receptacle opening and at a distance from an end of the first arm.

9. The retention apparatus of claim 1, wherein:
the pivotable bar is configured to pivot at least partially out of and into an actuation channel when locking and unlocking the attachment assembly to and from the component of the vehicle;
the lock opening is formed in a first wall of the housing;
the one or more first biasing elements comprise one or more legs of the pivotable bar that abut against a second wall of the housing; and
the actuation channel is defined between (i) the first wall of the housing and (ii) the second wall of the housing, the second wall opposite of the first wall across the actuation channel.

10. A retention apparatus, comprising:
an attachment assembly comprising:
a pivotable bar movable in a pivot direction to lock the attachment assembly to a component of a vehicle, and
an actuation bar movable in an actuation direction to position the pivotable bar to unlock the attachment assembly;
a support arm configured to couple to the attachment assembly, the support arm comprising a semi-ball shaped section;
a curved plate configured to interface with the semi-ball shaped section; and
a holder receiving the curved plate, the holder comprising:
a first frame comprising a first edge configured to abut against a first side of an accessory, the semi-ball shaped section of the support arm received at least partially in the first frame, and the first frame pivotable relative to the semi-ball shaped section to adjust a position of the accessory.

11. The retention apparatus of claim 10, wherein the holder further comprises one or more biasing elements positioned in the first frame and configured to bias the curved plate toward the semi-ball shaped section to generate a friction force that opposes movement of the first frame.

12. The retention apparatus of claim 10, wherein the holder further comprises:

a second frame movable relative to the first frame, the second frame comprising a second edge configured to abut against a second side of the accessory.

13. The retention apparatus of claim 12, wherein the second frame comprises:

one or more columns extending into the first frame; and one or more pawls positioned in the one or more columns and pivotably coupled to the one or more columns.

14. The retention apparatus of claim 13, wherein the holder further comprises:

one or more first biasing elements coupled between the first frame and the one or more columns of the second frame; and one or more actuator columns extending into the first frame.

15. The retention apparatus of claim 14, wherein the one or more first biasing elements include one or more constant force springs configured to apply a force that is 10 pounds or less, and the holder further comprises:

an interference interface of the first frame; and a handle coupled to the one or more actuator columns, wherein the handle is movable to engage and disengage the one or more pawls to and from the interference interface.

16. The retention apparatus of claim 10, wherein the curved plate comprises a plurality of detent openings, each detent opening corresponding to a different orientation of the holder relative to the support arm, and a detent is configured to be positioned in at least one of the detent openings.

17. A retention apparatus, comprising:

an attachment assembly comprising:

a pivotable bar pivotable in a first direction to lock the attachment assembly to a component of a vehicle, and an actuation bar movable in an actuation direction to pivot the pivotable bar in a second direction to unlock the attachment assembly, the second direction different than the first direction; and a support arm configured to couple to the attachment assembly, wherein the support arm comprises:

a semi-ball shaped section configured to interface with a curved plate, wherein the curved plate is pivotable relative to the semi-ball shaped section to adjust a position of an accessory relative to the component of the vehicle, the semi-ball shaped section having a center of curvature that is positioned outside of an inner space defined by the semi-ball shaped section, and a rod section extending relative to the semi-ball shaped section.

18. The retention apparatus of claim 17, wherein the semi-ball shaped section has a radius of curvature that is at least 0.5 inches.

19. The retention apparatus of claim 18, wherein the semi-ball shaped section has an azimuthal angle that is less than 180 degrees.

20. The retention apparatus of claim 17, wherein the pivotable bar is configured to pivot at least partially out of and into an actuation channel when locking and unlocking the attachment assembly to and from the component of the vehicle.

* * * * *